US010928799B2

(12) United States Patent
Fletcher et al.

(10) Patent No.: US 10,928,799 B2
(45) Date of Patent: *Feb. 23, 2021

(54) PATH REPEATABLE MACHINING FOR FULL SIZED DETERMINANT ASSEMBLY

(71) Applicant: The Boeing Company, Chicago, IL (US)

(72) Inventors: Luke Fletcher, Melbourne (AU); Phillip J. Crothers, Melbourne (AU)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,944

(22) Filed: May 27, 2020

(65) Prior Publication Data

US 2020/0293015 A1    Sep. 17, 2020

Related U.S. Application Data

(63) Continuation of application No. 14/273,629, filed on May 9, 2014, now Pat. No. 10,691,097.

(51) Int. Cl.
*G06F 7/66*      (2006.01)
*G05B 19/19*    (2006.01)
(Continued)

(52) U.S. Cl.
CPC .......... *G05B 19/19* (2013.01); *B25J 9/1687* (2013.01); *G05B 19/4207* (2013.01);
(Continued)

(58) Field of Classification Search
CPC ..................................................... G05B 19/19
(Continued)

(56) References Cited

U.S. PATENT DOCUMENTS 5,231,747 A    8/1993   Clark et al.
5,956,251 A    9/1999   Atkinson et al.
(Continued)

FOREIGN PATENT DOCUMENTS

CN    101813931 A    8/2010
GB      2496977 A    8/2013
(Continued)

OTHER PUBLICATIONS

U.S. Appl. No. 14/273,629, Notice Of Allowance And Fees Due (Ptol-85) dated Feb. 5, 2020, 8 pgs.
(Continued)

*Primary Examiner* — Evral E Bodden
(74) *Attorney, Agent, or Firm* — Kwan & Olynick LLP

(57) ABSTRACT

Systems, methods, and apparatus are disclosed for machining a part. Methods include generating a first spatial representation identifying a first orientation of a machining tool, and mechanically coupling an end effector to the part at a first position, the end effector including the machining tool and a coupling tool. Methods include generating a second spatial representation identifying a second orientation of the machining tool relative to the part, the first and second spatial representations being generated based on images captured by at least one imaging device and measurements from a plurality of sensors. Methods include identifying a plurality of differences that result from the coupling and that include a rotational distance and translational distance, the identifying being based on a comparison of a first image and a second image. Methods include adjusting the machining tool to return the machining tool to the first orientation at the first position.

20 Claims, 8 Drawing Sheets

(51) Int. Cl.
*G05B 19/42* (2006.01)
*B25J 9/16* (2006.01)

(52) U.S. Cl.
CPC .............. *G05B 2219/36492* (2013.01); *G05B 2219/37037* (2013.01); *G05B 2219/45059* (2013.01); *G05B 2219/45129* (2013.01); *G05B 2219/50126* (2013.01); *G05B 2219/50356* (2013.01)

(58) Field of Classification Search
USPC ........................................................ 700/160
See application file for complete search history.

(56) References Cited

U.S. PATENT DOCUMENTS

| | | | |
|---|---|---|---|
| 6,170,157 | B1 | 1/2001 | Munk et al. |
| 6,314,630 | B1 | 11/2001 | Munk et al. |
| 6,545,705 | B1 | 4/2003 | Sigel et al. |
| 7,161,741 | B1 * | 1/2007 | Schaack ................... G02B 7/04 359/676 |
| 7,259,535 | B1 | 8/2007 | Pastusak et al. |
| 9,349,629 | B2 | 5/2016 | Blank et al. |
| 9,677,869 | B2 * | 6/2017 | Berkeley ................ A61B 3/102 |
| 9,684,380 | B2 * | 6/2017 | Kramer ................. G06F 3/0425 |
| 10,335,116 | B2 * | 7/2019 | Boctor ................. A61B 8/4263 |
| 10,691,097 | B2 | 6/2020 | Fletcher et al. |
| 2002/0104207 | A1 | 8/2002 | Smith et al. |
| 2006/0115320 | A1 | 6/2006 | Wood et al. |
| 2010/0022638 | A1 | 1/2010 | Hoeg et al. |
| 2010/0228384 | A1 | 9/2010 | Neumaier et al. |
| 2011/0119919 | A1 | 5/2011 | Crothers |
| 2013/0004150 | A1 | 1/2013 | Wakamatsu |
| 2013/0041508 | A1 | 2/2013 | Hu et al. |
| 2013/0325179 | A1 | 12/2013 | Lao et al. |
| 2015/0002374 | A1 | 1/2015 | Erinjippurath et al. |
| 2015/0023748 | A1 | 1/2015 | Carberry et al. |
| 2015/0323922 | A1 | 11/2015 | Fletcher et al. |
| 2016/0144511 | A1 | 5/2016 | Romanov et al. |

FOREIGN PATENT DOCUMENTS

| | | |
|---|---|---|
| JP | 2000511827 A | 9/2000 |
| JP | 2002018754 A | 1/2002 |
| JP | 2010225141 A | 10/2010 |
| JP | 2012171093 A | 9/2012 |
| WO | 9746925 A1 | 12/1997 |
| WO | 2013114090 A1 | 8/2013 |

OTHER PUBLICATIONS

U.S. Appl. No. 14/273,629, Notice Of Allowance And Fees Due (Ptol-85), dated Jun. 1, 2020, 5 pgs.
U.S. Appl. No. 14/273,629, Advisory Action dated Feb. 14, 2019, 3 pgs.
U.S. Appl. No. 14/273,629, Final Office Action dated Feb. 13, 2018, 39 pgs.
U.S. Appl. No. 14/273,629, Final Office Action dated Dec. 4, 2018, 38 pgs.
U.S. Appl. No. 14/273,629, Non Final Office Action dated Jul. 5, 2018, 37 pgs.
U.S. Appl. No. 14/273,629, Non Final Office Action dated Aug. 8, 2017, 35 pgs.
U.S. Appl. No. 14/273,629, Non Final Office Action dated Apr. 12, 2019, 40 pgs.
Australian Application Serial No. 2015201429, Office Action dated Oct. 16, 2018, 3 pgs.
Canadian Application Serial No. 2,884,899, Office Action dated Feb. 20, 2017, 12 pgs.
Canadian Application Serial No. 2,884,899, Office Action dated Mar. 8, 2016, 4 pgs.
Chinese Application Serial No. 201510226414.0, Office Action dated Feb. 24, 2018, 11 pgs.
European Application Serial No. 15166927.2, Search Report dated Nov. 5, 2015, 8 pgs.
Japanese Application Serial No. 2015-074901, Office Action dated Feb. 26, 2019, 12 pgs.
Japanese Application Serial No. 2015-074901, Office Action dated Oct. 3, 2019, 8 pgs.
Orientation (geometry); Wikipedia, 2019, 1 pg.

* cited by examiner

PATH REPEATABLE MACHINING FOR FULL SIZED DETERMINANT ASSEMBLY

CROSS-REFERENCE TO RELATED APPLICATIONS

This application is a continuation application of U.S. application Ser. No. 14/273,629, filed May 9, 2014, and granted on Jun. 23, 2020 as U.S. Pat. No. 10,691,097, which is incorporated by reference herein in its entirety for all purposes.

TECHNICAL FIELD

This disclosure generally relates to vehicles and machinery and, more specifically, to machining techniques that may be used with such vehicles and machinery.

BACKGROUND

Production environments, such as those of the aerospace industry, often require a precision tooling and assembly of parts and equipment that meets stringent design constraints. However, such production environments also often require efficient tooling processes that allow for a greater throughput on the production floor. Conventional tooling equipment and methods remain limited because they often utilize large and cumbersome machinery that may require significant amounts of machining during an assembly process, thus slowing down the throughput of the entire assembly process. For example, when the parts are being assembled, mating parts may need to be match drilled. Such a process may require the mating parts to be stacked, clamped together, and drilled according to a drill pattern determined by a drill jig. The mating parts may then be disassembled for cleaning and/or deburring and then reassembled during the next step of the assembly process.

SUMMARY

Provided are systems, methods, and apparatus for machining parts. In various embodiments, the methods may include generating a first spatial representation identifying a first orientation of a machining tool relative to the part at a first position, mechanically coupling an end effector to the part at a first position, the end effector including the machining tool and a coupling tool, and generating, after the coupling and using a processor, a second spatial representation identifying a second orientation of the machining tool relative to the part at the first position, the first and second spatial representations being generated based, at least in part, on images captured by at least one imaging device and measurements from a plurality of sensors. Methods also include identifying, using the processor, a plurality of differences that result from the coupling and that comprise a rotational distance and translational distance, the identifying being based, at least in part, on a comparison of a first image included in the first spatial representation and a second image included in the second spatial representation. Methods further include adjusting the machining tool to return the machining tool to the first orientation relative to the part at the first position and compensate for identified differences resulting from the coupling.

In some embodiments, the first spatial representation and the second representation are included in a plurality of spatial representations, and the plurality of spatial representations further includes a third spatial representation identifying a first orientation of the machining tool relative to the part at a second position. In various embodiments, the methods further include performing, using the machining tool, a first machining operation on the part at the first position, moving the end effector to the second position, mechanically coupling, using the coupling tool, the end effector to the part at the second position, generating a fourth spatial representation identifying a second orientation of the machining tool relative to the part at the second position, adjusting the machining tool in response to the fourth spatial representation being different than the third spatial representation, wherein the adjusting of the machining tool returns the machining tool to the first orientation relative to the part at the second position, and performing, using the machining tool, a second machining operation on the part at the second position.

According to some embodiments, the first machining operation and the second machining operation are drilling operations. In some embodiments, generating the first spatial representation includes capturing the first image of the first position using the at least one imaging device, obtaining a first set of measurements of the first position from the plurality of sensors, and generating the second spatial representation includes capturing the second image of the first position using the at least one imaging device, and obtaining a second set of measurements of the first position from the plurality of sensors. In some embodiments, determining that the second spatial representation is different than the first spatial representation at the first position includes comparing the first image with the second image, and identifying at least one difference between the first image and the second image based on the comparing of the first image with the second image. In various embodiments, the comparing of the first image with the second image includes comparing a first feature included in the first image with a second feature included in the second image, wherein the first feature identifies a first characteristic of a surface of the part, and wherein the second feature identifies a second characteristic of the surface of the part. According to some embodiments, the first characteristic is the same as the second characteristic. In some embodiments, the first feature and the second feature are surface features extracted from the first image and the second image of the part.

In various embodiments, the first spatial representation identifies a first surface orientation of the part at the first position, and the second spatial representation identifies a second surface orientation of the part at the first position. According to some embodiments, the moving of the end effector is performed by a positioner. In some embodiments, the end effector is communicatively coupled to a data processing system, and the positioner is controlled by the data processing system. In various embodiments, the data processing system is an external data processing system.

Also disclosed are apparatus for machining a part, the apparatus including a positioner having a first end, an end effector including a housing, the housing being coupled to the first end of the positioner, a machining tool included in the housing, a plurality of sensors configured to measure a position and orientation of the end effector and machining tool relative to the part based, at least in part, on distance measurements, and a coupling tool coupled to the housing, wherein the coupling tool is configured to mechanically couple the end effector with the part. The apparatus also include an imaging device included in the housing and configured to capture images of the part, wherein at least one spatial representation of the machining tool is generated based, at least in part, on the distance measurements and at least one of the images captured by the imaging device, wherein the at least one spatial representation enables the identification of differences including a rotational distance and translational, the differences being identified based on a comparison of the images and the distance measurements, and further enables adjusting of the machine tool that compensates for the identified differences.

In some embodiments, the machining tool includes a drill configured to drill a hole in a material of the part. In various embodiments, the coupling tool includes a clamping plate configured to apply pressure to the part. According to some embodiments, the plurality of sensors includes a plurality of linear distance sensors. In some embodiments, the plurality of distance sensors includes a plurality of sensors selected from the group consisting of: a plurality of linear variable distance transformers and a plurality of optical encoders.

Also disclosed herein are methods for machining a part, the methods including moving an end effector to a position identified by a machining pattern associated with the part, the end effector including a machining tool and a coupling tool, generating a first spatial representation identifying a first orientation of the machining tool relative to the part, mechanically coupling, using the coupling tool, the end effector to the part at the position, and generating, after the coupling and using a processor, a second spatial representation identifying a second orientation of the machining tool relative to the part, the first and second spatial representations being generated based, at least in part, on images captured by an imaging device and measurements from a plurality of sensors. The methods may also include identifying, using the processor, a plurality of differences that result from the coupling and that comprise a rotational distance and translational distance, the identifying being based, at least in part, on a comparison of the image included in the first spatial representation and the image included in the second spatial representation, and adjusting the machining tool in response to determining that the second spatial representation is different than the first spatial representation.

In some embodiments, generating the first spatial representation includes capturing a first image using the imaging device, wherein generating the second spatial representation includes capturing a second image using the imaging device, and wherein the determining that the second spatial representation is different than the first spatial representation at the position includes comparing the first image with the second image, and identifying at least one difference between the first image and the second image based on the comparing of the first image with the second image. These and other features will be described in greater detail herein.

DETAILED DESCRIPTION

Figure 1:
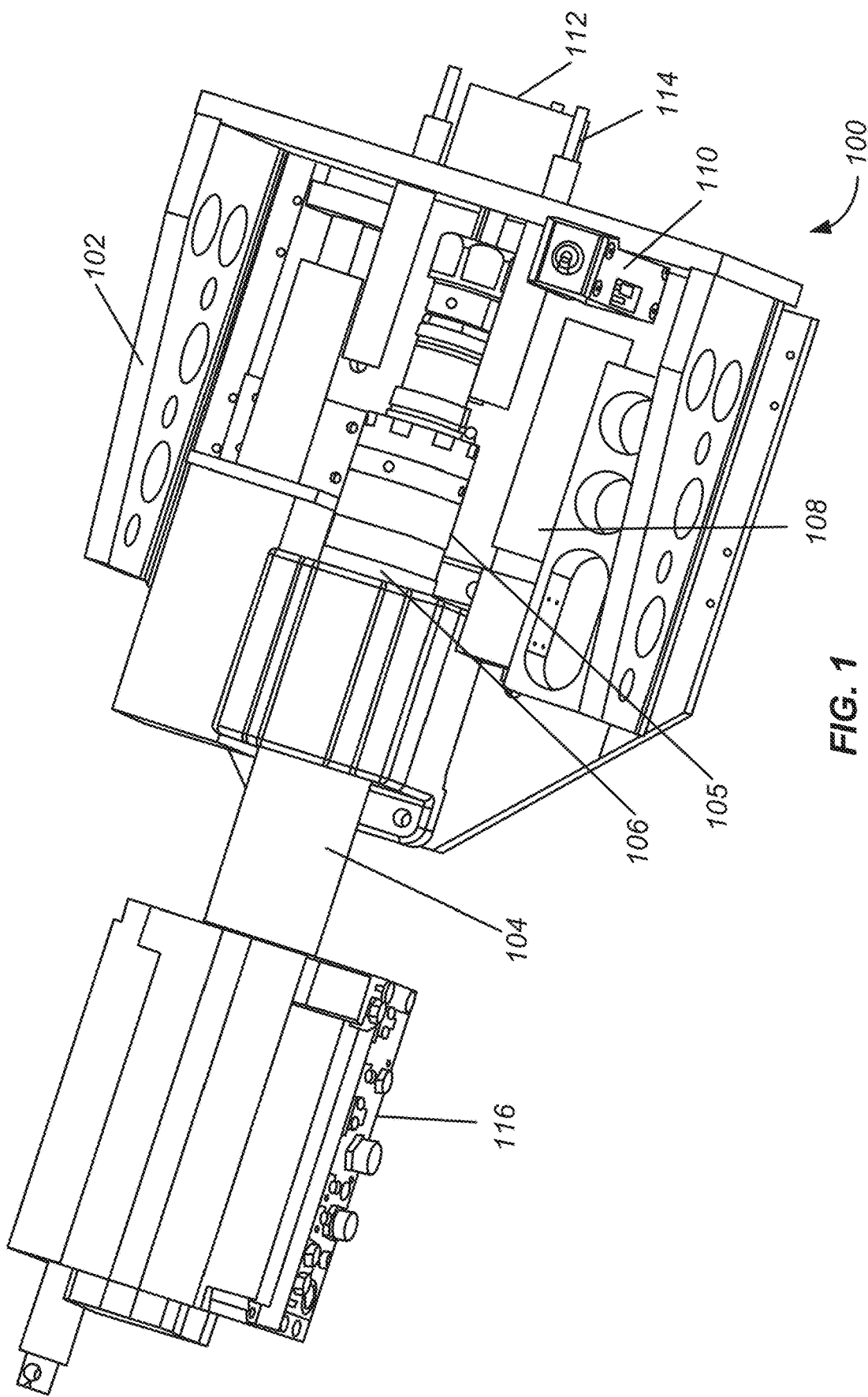
FIG. 1 illustrates an example of an apparatus for machining a part, implemented in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

A machining process may be used to machine or tool a part that may be assembled with other parts and included in a vehicle such as an airplane or spacecraft. The machining process may include drilling into the part. The part may be held in place by a fixture which may be coupled to a support platform. However, the part may move in its fixture due to the rotational force applied by the drill or other mechanical coupling associated with the drill. Moreover, the part or a manipulator used to hold the drill may move due to gearbox backlash. These movements of the drill relative to the part that occur as part of the machining process may cause the machined position, which may be the hole that is being drilled, and all subsequent positions to be misaligned and out of tolerance. Accordingly, these machining force disturbances may significantly degrade the actual machining positioning precision achieved when compared to the ideal machine positions which may be specified by the manufacturer.

In an attempt to address such force related movement issues, conventional machining methods may require the use of separate metrology systems, as well as the use of larger and heavier machines that are designed to use their size and mass to resist machining forces. Other conventional methods have implemented offline modeling techniques which use computer models in an attempt to model the changes in position that will occur during the machining process. However, such conventional machining methods remain limited in their applications due to the enormous size of the machines as well as the limitations of the computer models, which may be limited to deterministic deformations. Moreover, such conventional machining methods remain limited because they cannot effectively and efficiently machine parts to small and precise tolerances, which may be in the order of a few micrometers.

Various systems, methods, and apparatus are disclosed herein that may use a process of determinant assembly in which holes in mating parts are pre-drilled with precision prior to an assembly process associated with the mating parts. Thus, no machining is required during the assembly process because the parts arrive at the assembly line pre-drilled and only require assembly. Accordingly, throughput of the assembly process is greatly increased.

Moreover, various systems, methods, and apparatus disclosed herein may enable the accurate machining of parts despite force disturbances which may occur during the machining process. In some embodiments, a two pass machining process may be implemented when machining parts to ensure that the machined locations on the part are as accurate as the machine path repeatability allows. In a first pass, a positioning machine or positioner, which may include a robot, or computer numerical control (CNC) machine, may be used to observe the positions on the part and generate spatial representations of them without performing any machining. In a second pass, the saved positions and spatial representations are used to correct the machining positions to compensate for movement of the part or manipulator which may occur due to the machining process. In some embodiments a one-pass machining process may be implemented which also ensures that the machined locations on the part are as accurate as the machine path repeatability allows. Moreover, if one is not provided, various embodiments disclosed herein may generate a machining pattern which identifies several positions to be machined on a part. In this way, various systems, methods, and apparatus disclosed herein provide accurate machining for determinant assembly without the use of larger machinery or complex drilling jigs.

FIG. 1 illustrates an example of an apparatus for machining a part, implemented in accordance with some embodiments. The apparatus may be an end effector, such as end effector 100, that may be a machining assembly mounted on or coupled to the end of a manipulator, positioner, or robot arm that may be used in a machining process. In some embodiments, end effector 100 may include one or more components that may be used to machine a part, which may be a mechanical part or component, based on a machining pattern. In some embodiments, the machining pattern may have been previously determined and provided to end effector 100, or may have been determined by end effector 100 itself, as discussed in greater detail with reference to FIG. 6. For example, a machining pattern may include or identify several holes to be drilled at different positions with respect to a part. End effector 100 may be configured to identify the positions and drill holes at the identified positions while correcting for any deflections or movements which may occur during the machining process, thus ensuring accurate and efficient implementation of the machining pattern to the part. According to some embodiments, one or more components of end effector 100, such as sensors and imaging devices discussed in greater detail below, may be packaged and implemented as a kit that upgrades the functionality of an existing system, which may include a CNC machine or a robot.

In various embodiments, end effector 100 may include housing 102 which may also be referred to herein as an end effector housing. Housing 102 may include one or more surfaces that form a rigid casing configured to house various other components that are also included in end effector 100. Accordingly, housing 102 is configured to provide structural support for the internal components of end effector 100. Housing 102 may be an enclosed housing, or may be a semi-enclosed housing. Moreover, housing 102 may be made of a material selected based on rigidity and weight characteristics. For example, housing 102 may be made of a material that is relatively light and rigid, such as aluminum.

In various embodiments, end effector 100 may include one or more machining tools which may be coupled to housing 102. For example, end effector 100 may include machining tool 104. In some embodiments, machining tool 104 may include one or more components that may be configured to perform various machining processes or operations. For example, machining tool 104 may be configured as a drill that may drill holes in a material of a part. In various embodiments machining tool 104 includes control hardware and logic configured to control the operation of machining tool 104. In some embodiments, the control hardware and logic of machining tool 104 may be communicatively coupled to communications interface 116, discussed in greater detail below. In this way, an external data processing system, and a control program implemented on the data processing system, may be configured to control the operation of machining tool 104.

In various embodiments, machining tool 104 may include one or more components that are configured to enable or facilitate performing one or more machining operations or processes. For example, machining tool 104 may include spindle 107, which may be a rotating unit that includes a shaft which provides a rotating axis for machining tool 104. In some embodiments, spindle 107 may be configured to rotate and/or extend a drill bit attached to an end of machining tool 104. In one example, spindle 107 may be a pneumatic spindle that has a four inch stroke. In various embodiments, machining tool 104 may further include drive and load cell 105 which may be configured to drive a rotation of spindle 107 and generate a signal describing the operation of spindle 107. In various embodiments, the signal may be provided to an external data processing system via communications interface 116. While various embodiments described herein include a spindle and drill, according to various embodiments, machining tool 104 may instead include one or more other tools, such as a painting nozzle, glue gun, welding tool, grinding disk, or laser scanner used to obtain a measurement that may be included in a part profile. Thus, machining tool 104 may be configured to perform various other machining operations with precision, such as painting, gluing, welding, grinding, or scanning.

In various embodiments, end effector 100 may further include imaging device 108. In some embodiments, imaging device 108 may include one or more sensing devices, such as an ultrasonic sensor or a camera. For example, imaging device 108 may be a digital camera configured to encode and store digital images that include at least a portion of a spatial representation of a part which may be adjacent to end effector 100. For example, imaging device 108 may include a charge-coupled device (CCD) or complimentary metal-oxide-semiconductor (CMOS) sensor. The sensor may be configured to record images having a resolution of 640 pixels by 480 pixels. Moreover, imaging device 108 may be configured to have a relatively shallow field of view (FOV) which may be about 1 mm. Imaging device 108 may be configured to record images which capture positional data, such as details, textures, features, and characteristics of a surface of the part which may be adjacent to end effector 100. For example, the recorded images may identify a grain or one or more ridges or scratches associated with the part, as well as other distinguishing features or characteristics. In some embodiments, imaging device 108 may include multiple cameras. Thus several cameras may be used to capture images associated with the spatial representation of a part. In some embodiments, imaging device 108 may be mounted within housing 102, and housing 102 may include a hole or window through which imaging device 108 may observe the surface of the part that is to be machined. Moreover, imaging device 108 may include associated control hardware and logic that may be configured to control the operation of imaging device 108. In some embodiments, the control hardware and logic of imaging device 108 may be coupled to communications interface 116, discussed in greater detail below, which may be coupled to an external data processing system. In this way, the external data processing system, and a control program implemented on the data processing system, may be configured to control the operation of imaging device 108.

In some embodiments, end effector 100 may also include light source 110 which may be included within housing 102 and may be mounted adjacent to the window or hole associated with imaging device 108. Thus, light source 110 may be configured to provide a diffuse source of light that emits light through the hole associated with imaging device 108. In this way, light emitted by light source 110 may illuminate a part which may be adjacent to end effector 100 and may provide sufficient incident light for imaging device 108 to record one or more images of the surface of the part. In various embodiments, light source 110 may include associated control hardware and logic which may also be controlled by an external data processing system via a communicative connection with imaging device 108 or with communications interface 116. It will be appreciated, that while FIG. 1 illustrates one camera and one light source, end effector 100 may include multiple cameras and multiple light sources to provide additional positional accuracy.

In some embodiments, end effector 100 may include coupling tool 112 which may be configured to mechanically couple end effector 100 with a part that will be machined. For example, coupling tool 112 may include a pressure or clamping plate that is configured to apply pressure to the part that may be adjacent to end effector 100. The applied pressure may hold the part against a support platform such that the part remains substantially stationary during one or more subsequent machining processes. In some embodiments, coupling tool 112 includes a clamp or clamping plate which may be coupled to and moved by an actuator. According to various embodiments, coupling tool 112 may include a non-slip material mounted on a pivot bearing. Thus, the non-slip material mounted on the pivot bearing may keep the part substantially stationary. In some embodiments, coupling tool 112 may include a locking mechanism that may be engaged with an electro magnet. Thus, the locking mechanism may lock the part into place and hold it substantially stationary. In some embodiments, the use of coupling tool 112 may be optional, and the part may be sufficiently fixed in place such that no clamping is performed. In various embodiments, coupling tool 112 may include associated control hardware and logic which may also be controlled by an external data processing system via a communicative connection with communications interface 116. The control logic and hardware may be configured to control the operation of the clamp and actuator, and may be configured to control the clamping and unclamping of the adjacent part.

In various embodiments, end effector 100 may further include several sensors, such as sensor 114. The sensors may determine and record positional information associated with a part which may be adjacent to end effector 100. In some embodiments, the sensors may be configured to make one or more sets of distance measurements in which the sensors measure a distance between an external surface of housing 102 and a surface of the part that is adjacent to end effector 100. The sensors, such as sensor 114, may be linear variable differential transformers (LVDTs) which each make a linear distance measurement. For example, the sensors may include three micron precision LVDTs positioned such that the relationship between a distance measurement made by each LVDT may identify a surface orientation, which may be a normal vector associated with the surface of the part. In various embodiments, the sensors may be optical encoders that use displacement probes and optical gratings. Thus, one or more optical gratings may be used by displacement probes of an optical encoder to determine or measure distance measurements. In this way, the collective measurements made by all of the sensors maybe used to determine a distance to the part, a surface orientation of the part, and an orientation of the part relative to end effector 100. In various embodiments, sensors, such as sensor 114, may be coupled to an external data processing system via a communicative connection with communications interface 116. Accordingly, sensor 114 may communicate recorded sets of measurements to the data processing system in real time.

In some embodiments, end effector 100 may include communications interface 116. Communications interface 116 may include one or more connectors or communications links that may be coupled to an external data processing system. The connection between communications interface 116 and the data processing system may be made via a communications cable. Moreover, the connection between communications interface 116 and the data processing system may be made via a wireless connection.

Figure 2:
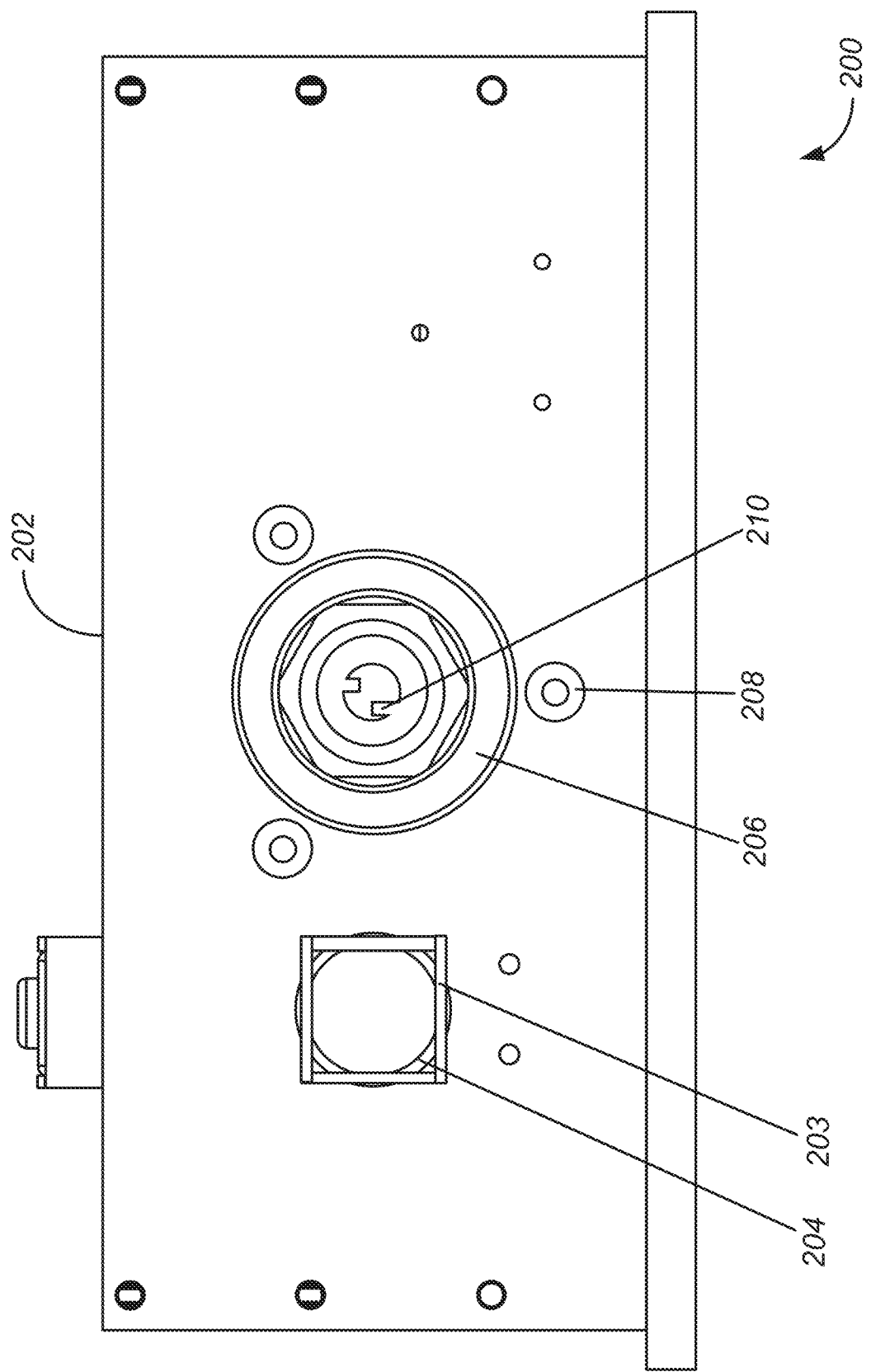
FIG. 2 illustrates another example of an apparatus for machining a part, implemented in accordance with some embodiments.

FIG. 2 illustrates another example of an apparatus for machining a component, implemented in accordance with some embodiments. As similarly discussed above with reference to end effector 100, end effector 200 may include housing 202 which may be configured to house and provide structural support for various components included in end effector 200. As shown in FIG. 2, housing 202 may include hole 203 which may be configured to provide a line of sight between imaging device 204, which is mounted within housing 202, and a part which may be adjacent to end effector 200 and external to housing 202.

In some embodiments, end effector 200 may further include coupling tool 206. As shown in FIG. 2, coupling tool 206 may have an annular or ring shape and a relatively flat front surface that interfaces with the part that may be adjacent to end effector 200 when pressure is applied to the part. In various embodiments, end effector 200 may also include several sensors, such as sensor 208, which may be configured to make one or more distance measurements relative to the part. As similarly discussed above in FIG. 1 with reference to machining tool 104, end effector 200 may also include a machining tool. As shown in FIG. 2, the machining tool may include drill bit 210 which may be configured to drill a hole in the part when rotated and extended during a drilling operation or process.

Figure 3:
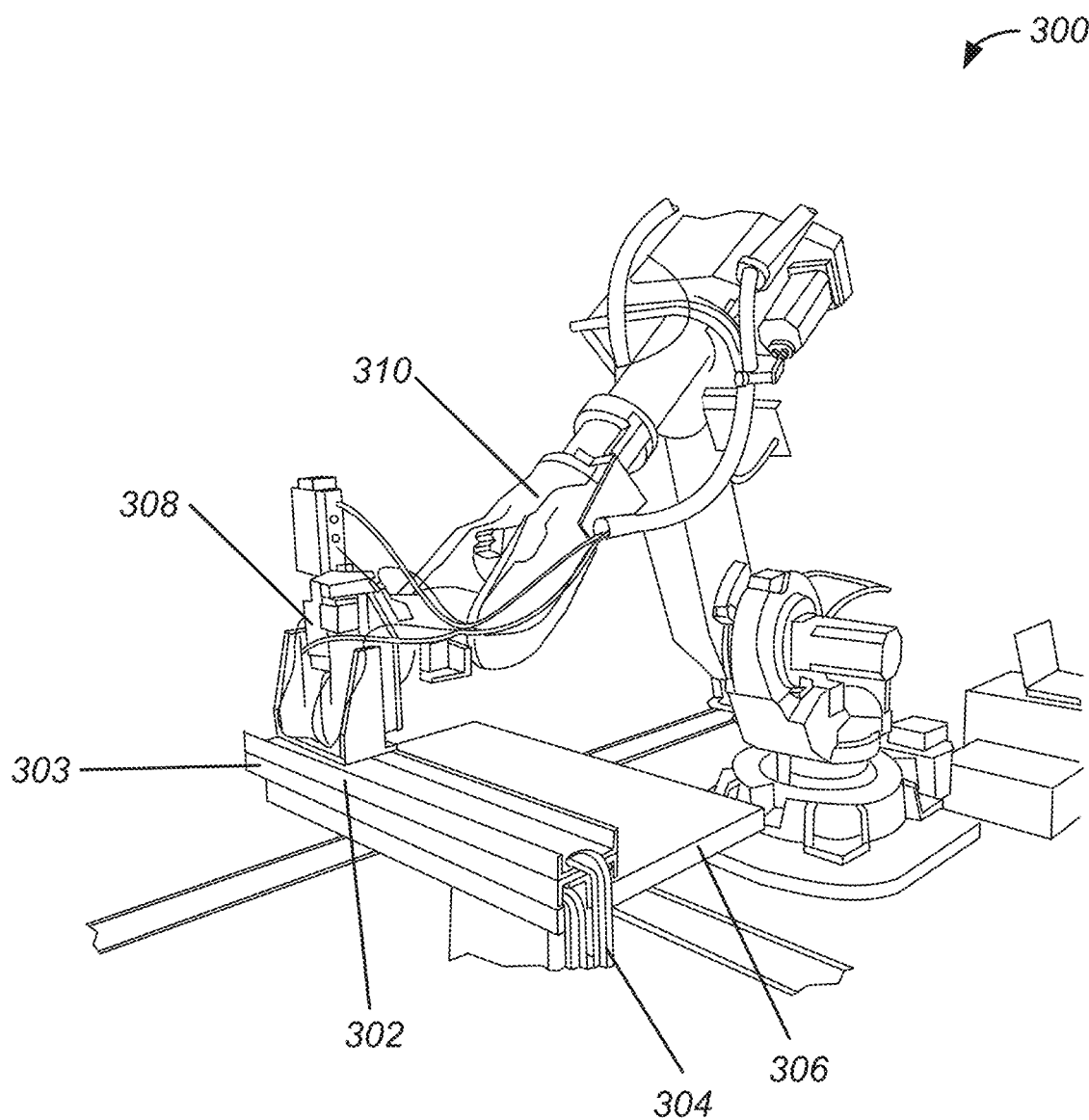
FIG. 3 illustrates yet another example of an apparatus for machining a part, implemented in accordance with some embodiments.

FIG. 3 illustrates yet another example of an apparatus for machining a component, implemented in accordance with some embodiments. As similarly discussed above with reference to end effector 100 and end effector 200, machining assembly 300 may include end effector 308. As shown in FIG. 3, end effector 308 is mounted on positioner 310. Positioner 310 may include one or more joints and motors configured to position and control the movement of end effector 308. In various embodiments, positioner 310 may be controlled by an external data processing system that is also communicatively coupled with end effector 308. In this way, data received from end effector 308 may be processed by the external data processing system and used to control the movement and orientation of positioner 310, and consequently end effector 308.

In some embodiments, machining assembly 300 may further include support platform 306 which may be configured to provide a resting position for one or more parts that are to be machined, such as part 302 and part 303. In various embodiments, clamp 304 may be coupled to support platform 306 and may be configured to mechanically couple part 302, part 303, and platform 306 to each other. For example, clamp 304 may apply an amount of pressure that mechanically couples part 302, part 303, and platform 306.

Figure 4:
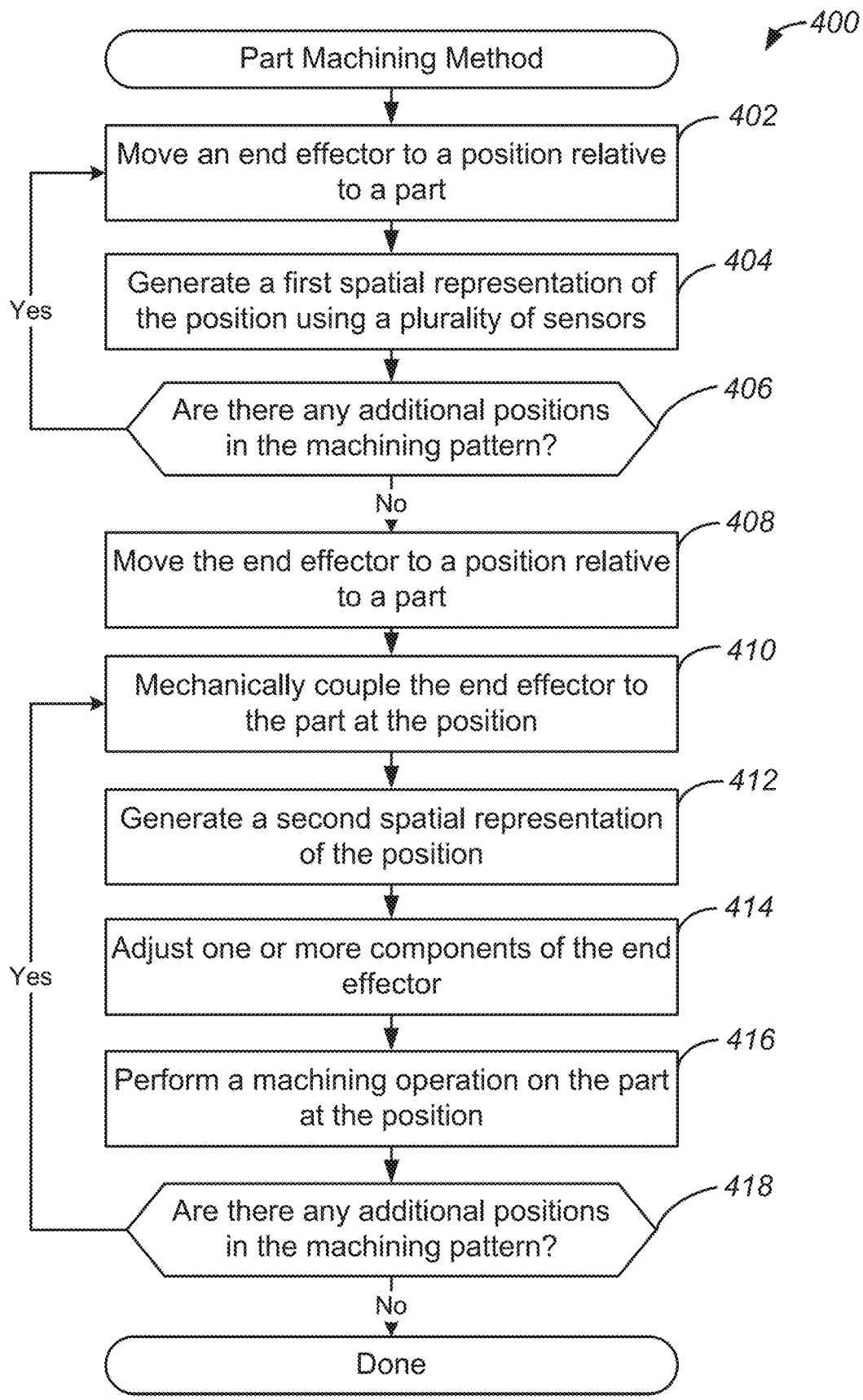
FIG. 4 illustrates a flow chart of an example of a method for machining a part, implemented in accordance with some embodiments.

FIG. 4 illustrates a flow chart of an example of a method for machining a part, implemented in accordance with some embodiments. As discussed above, a method for machining a part, such as method 400, may include performing one or more machining operations in accordance with a machining pattern. In various embodiments, method 400 may be implemented in two passes. In a first pass, a first spatial representation may be generated for each position in a machining pattern. The first spatial representation that has been generated for each position may be subsequently used as a reference position during a subsequent machining operation. Accordingly, once the first spatial representations have been generated and recorded, a second pass may be initiated. The actual machining of the part may be performed during the second pass. Accordingly, the part may be clamped and drilled at each of the positions identified in the machining pattern. During the second pass a second spatial representation may be generated for a particular position after the part has been clamped. The second spatial representation may be compared with the previously generated first spatial representation, any movement or positional error between the two may be corrected, and the part may be machined at that particular position. In this way, any errors in the positioning of the end effector or the part may be corrected, and each position of the machining pattern may be machined with a high degree of accuracy.

Accordingly, method 400 may commence at operation 402 by moving the end effector to a position relative to the part. As previously discussed, the position may be identified and determined based on a machining pattern associated with the part to be machined. For example, a particular part to be used in a determinative assembly process may have a particular pattern of holes to be drilled into it so that it may be combined properly with other parts during the assembly process. As previously discussed, the tolerance for positioning of the holes may be relatively small, thus requiring a high level of accuracy in the machining process. For example, the tolerance for positioning of the holes may be less than 5 micrometers. In some embodiments, the machining pattern may have been previously provided and stored in a memory of a data processing system coupled to and configured to control the operation of the end effector. For example, the machining pattern may have been generated by an aircraft manufacturer that will use the part in an assembly process. In various embodiments, the machining pattern may have been determined by the end effector based on another part which has already been machined, as will be discussed in greater detail below with reference to FIG. 6.

In some embodiments, a machining assembly that includes the end effector may be configured to iteratively proceed or step through the positions included in the machining pattern as a state machine. For example, at operation 402, a data processing system may identify a first position based on the current state of the data processing system. The first position represented in the machining pattern may include one or more data values corresponding to a first spatial position associated with the part. In some embodiments, the representation of the first position stored in the data processing system may include one or more data values identifying a position in a three dimensional coordinate system such as a three dimensional Cartesian coordinate system. Accordingly, at operation 402, the data processing system may provide an input to a positioner coupled to the end effector. The input may cause the positioner to move the end effector to the first position identified by the machining pattern.

During operation 404, a first spatial representation of the position may be generated using a plurality of sensors. In various embodiments, a spatial representation of a position may refer to a one or more data values or a data structure that includes all data values generated by the sensors as well as the imaging device included in the end effector. For example, a spatial representation may include distance measurements generated by several sensors. As previously discussed, the distance measurements may identify or indicate a surface normal and/or a surface orientation at a particular position. Moreover, the spatial representation may include the image captured by the imaging device. In some embodiments, the image may have been processed by image processing software to extract or identify surface features and characteristics from the recorded image. Such extracted surface features may be stored as one or more data values in a data structure associated with the spatial representation. In this way, a spatial representation may store all data and inferred data that is available for a particular position associated with a particular part. As similarly discussed above, the data stored in the spatial representation may identify an angle or surface orientation associated with a part at a particular position as well as a linear and rotational position which may be identified by coordinates in a Cartesian and/or polar coordinate system. Thus, a spatial representation may identify an orientation of the end effector and/or various components that may be included within the end effector, such as a machining tool. Accordingly, during operation 404, one or more data values may be received from the sensors and imaging device included in the end effector. The data values may be stored in a data structure as a first spatial representation of the position that identifies a first orientation of the end effector and a machining tool included in the end effector with respect to the part at the position.

During operation 406, it may be determined whether or not there are additional positions in the machining pattern. If the machining pattern includes multiple positions which may correspond to, for example, different holes, method 400 may return to operation 402 and the end effector may be moved to the next position in the machining pattern and a corresponding spatial representation may be generated. In this way, a spatial representation may be generated and stored for each position in the machining pattern. Accordingly, during operations 402-406, a first pass may be made relative to the part in which spatial representations are generated and stored for each position in the machining pattern. The stored spatial representations may be used subsequently during operations in which machining occurs. If it is determined that there are no additional positions in the machining pattern, the method 400 may proceed to operation 408.

During operation 408, the end effector may be moved to a position relative to the part. As similarly discussed above, the position may be identified based on a machining pattern associated with the part. In some embodiments, operation 408 may be the beginning of or part of a second pass associated with the part in which one or more machining operations will be performed using the previously generated spatial representations. For example, during operation 408, the end effector may be moved back to the first position of the machining pattern.

During operation 410, the end effector may be mechanically coupled with the part at the position the end effector was moved to during operation 408. In some embodiments, a coupling tool included in the end effector may be engaged and may provide mechanical coupling between the end effector and the part. For example, the end effector may include a clamp or clamping plate which extends from a housing of the end effector, comes into contact with a surface of the part, and applies pressure to the surface of the part to push against the part, which may consequently be pushed against another part or a support platform. When mechanically coupled in this way, the additional mechanical coupling provided by the coupling tool reduces the amount of movement of the part that may occur due to one or more subsequent machining operations. As previously discussed, the process of machining the part without such coupling may cause the part to move during the machining operation, and result in a machined part that is not within tolerances and is unusable in an assembly process. For example, if a hole is drilled in a part while it is not clamped, the part may move due to the rotation of the drill, and the resulting hole will not meet design specifications and tolerances. However, when mechanical coupling, such as clamping, is provided, such movement is prevented, and the hole may be drilled accurately and within design specifications and tolerances.

During operation 412, a second spatial representation of the position may be generated. As similarly discussed above, the second spatial representation may include distance measurements generated by several sensors as well as one or more data values generated based on an image recorded by the imaging device. Accordingly, during operation 412, one or more data values may be received from the sensors and imaging device included in the end effector. The data values may be stored in a data structure as a second spatial representation of the position.

In some embodiments, the second spatial representation of the position may be different than the first spatial representation because the mechanical coupling of the end effector to the part may have caused some movement in the part itself. For example, the application of pressure by the clamp to the part may have caused a small amount of rotation or linear translation in the positioning of the part. The second spatial representation may be generated after the coupling has occurred and after the part has been slightly moved. Thus, due to the mechanical coupling established during operation 410, the movement introduced to the part may result in the first spatial representation being slightly different than the second spatial representation.

During operation 414, one or more components of the end effector may be adjusted. In various embodiments, the end effector may be adjusted to compensate for any differences between the first spatial representation of the position and the second spatial representation of the position. For example, as previously discussed, the first representation may identify a first orientation of the end effector with respect to the part. The coupling of the end effector to the part may have changed its orientation relative to the part due to any movement that was introduced. Thus, the second spatial representation may be different than the first spatial representation and may identify a second orientation of the end effector and a machining tool included in the end effector. In various embodiments, during operation 414, one or more components of the end effector may be adjusted to return the end effector and its associated components to the first position, thus compensating for the movement introduced by the coupling.

In various embodiments, the adjusting may be performed based on a comparison of the first spatial representation and the second spatial representation. For example, an external data processing system may store in memory both the first spatial representation and the second spatial representation associated with a first position. The data processing system may be configured to compare one or more data values of the first and second spatial representations, and identify one or more differences between the two. For example, the data processing system may be configured to perform one or more image processing operations which identify a rotational distance and translational distance based on the differences between the two different images associated with the two spatial representations.

In some embodiments, the image processing operations may include identifying a first feature included in a first image associated with the first spatial representation and identifying a second feature included in a second image associated with the second spatial representation. As previously discussed, the first and second spatial representations have been generated with respect to the same position and will include a first and second image of distinguishing characteristics of the same position. However, because the second spatial representation may have been generated based on a different orientation, the features of the image and distinguishing characteristics of the surface of the position will be in different positions and orientations within the first and second images respectively. Accordingly, a control program implemented in the data processing system may be configured to identify at least a first feature in the first image that may identify a first characteristic of a surface of the part, such as a particular portion of a grain or a scratch. The data processing system may also identify at least a second feature in the second image that identifies a second characteristic of the surface of the part. In various embodiments, the first characteristic and the second characteristic are the same characteristic of the part's surface. However, they are represented differently in their respective images due to the movement that may have occurred during the coupling. Accordingly, the data processing system may perform one or more image recognition operations to determine that the underlying first and second characteristics are the same. The data processing system may then compare the first feature with the second feature and approximate a rotational change that may have occurred as well as any linear movement or translation which may have occurred that accounts for the observed differences between the first feature of the first image and the second feature of the second image.

Moreover, based on a comparison of a first set of measurements taken by the sensors for the first spatial representation and a second set of measurements taken by the sensors for the second spatial representation, the data processing system may also approximate a change in an orientation or angle of the end effector and its associated components with respect to the surface of the part. The identified changes may be stored in the data processing system for future use, and may also be stored as part of a log file. In some embodiments, the identified changes are represented as units of linear distance, such as micrometers, and units of radial distance, such as degrees.

In some embodiments, the adjustment may be applied to the entire end effector. In this way, a position of the entire end effector may be adjusted to modify or adjust a position of a machining tool included in the end effector. Thus, the data processing system may generate an adjustment signal based on the previously identified differences. The adjustment signal may include one or more instructions that cause a positioner coupled to the end effector to move and reposition or adjust the position of the end effector. The adjustment signal may be configured to include instructions which cause the positioner to perform one or more motions that are opposite to the identified differences between the first and second spatial representations. For example, if the comparison of the first and second spatial representations indicates that the part has moved 3 micrometers in a particular direction, the adjustment signal may include an instruction that causes the positioner to move the end effector, as well as a machining tool included in the end effector, 3 micrometers in the opposite direction, thus counteracting the motion that was previously caused by the coupling. Similar adjustments may be made for any axis of motion (x, y, z) or rotation. In various embodiments, the adjustment may be applied to an individual component of the end effector. For example, the machining tool may include associated hardware that enables the machining tool to be independently movable. In this example, the positioner and end effector may remain stationary while the machining tool is adjusted and repositioned based on the adjustment signal. In some embodiments, the machining tool may be moved by distances in the order of thousandths of an inch while the end effector and its associated coupling tool remain stationary.

Furthermore, additional factors or variables may be used as a basis of the adjustment. For example, according to some embodiments, various sensors and cameras discussed above with reference to FIG. 1 may also be configured to monitor a spatial orientation of a frame or jig that may surround the part and provide structural support during machining. Other factors or variables associated with these components, such as thermal expansion, could be detected and compensated for by adjusting one or more components of the end effector based on any differences caused by such factors or variables. Because factors and variables such as thermal expansion may be corrected for, mating components may be made of different materials at different manufacturing locations without the utilization of a tightly controlled thermal regulation system. Similarly, factors or variables associated with the machine itself could also be used as the basis of adjustment. Such factors or variables may include machine error, drift, and re-zeroing.

During operation 416, a machining operation may be performed on the part at the position. In various embodiments, the machining operation may include drilling a hole in the part at the position. Accordingly, a machining tool of the end effector may be engaged and may drill a hole in the part at the position. In some embodiments, the machining tool may be engaged in response to an input signal provided by the data processing system. Once the machining operation has been completed, method 400 may proceed to operation 418.

During operation 418, it may be determined whether or not there are any additional positions in the machining pattern. If it is determined that there are no additional positions in the machining pattern, method 400 may terminate. However, if it is determined that there are additional positions in the machining pattern, method 400 may return to operation 410 and additional iterations of coupling, generating, adjustment, and machining may be performed for each additional position in the machining pattern. For example, the operations previously described with respect to operations 410-416 may have been performed for a first position in a machining pattern. However, the machining pattern may include multiple positions. Thus, in the next iteration of operations 410-416, the end effector may be moved to a second position, coupling may be established, and a spatial representation of the second position may be generated after the coupling. As similarly discussed above, the spatial representation of the second position that was generated after the coupling may be compared with the previously generated spatial representation which may have been generated during an iteration of operation 404. The position and/or orientation of the end effector and machining tool may be modified or adjusted based on identified differences between the two spatial representations at the second position. It will be appreciated that this adjustment will also correct for any movement that was introduced by a previous machining operation, such as movement due to a rotation of the drill or gearbox backlash. Operations 410-416 may be performed for each additional position in the machining pattern. For example, if the machining pattern includes 5 positions, additional iterations of operations 410-416 may be performed for the third position, fourth position, and fifth position of the machining pattern.

While various embodiments and methods disclosed herein have been described with reference to positioners and repeatable machine paths, according to some embodiments, various operations described above may be performed optionally and independently of the existence of a repeatable machine path. Thus, various embodiments disclosed herein may be implemented in conjunction with a template or jig, and not a repeatable machine path. For example, a lightweight jig or template may be used to position an end effector locally at a hole. Such positioning may be performed manually or semi-automatically. Subsequently, as described above, various components of the end effector may be used correct for changes in orientations that may occur due to clamping or other additional factors or variables. In this way, various embodiments and methods described herein may be used in conjunction with a template or jig, and may correct changes locally at each hole based on positions designated by the template or jig. It will be appreciated that mating parts may be manufactured using a pair of matching templates or jigs.

Figure 5:
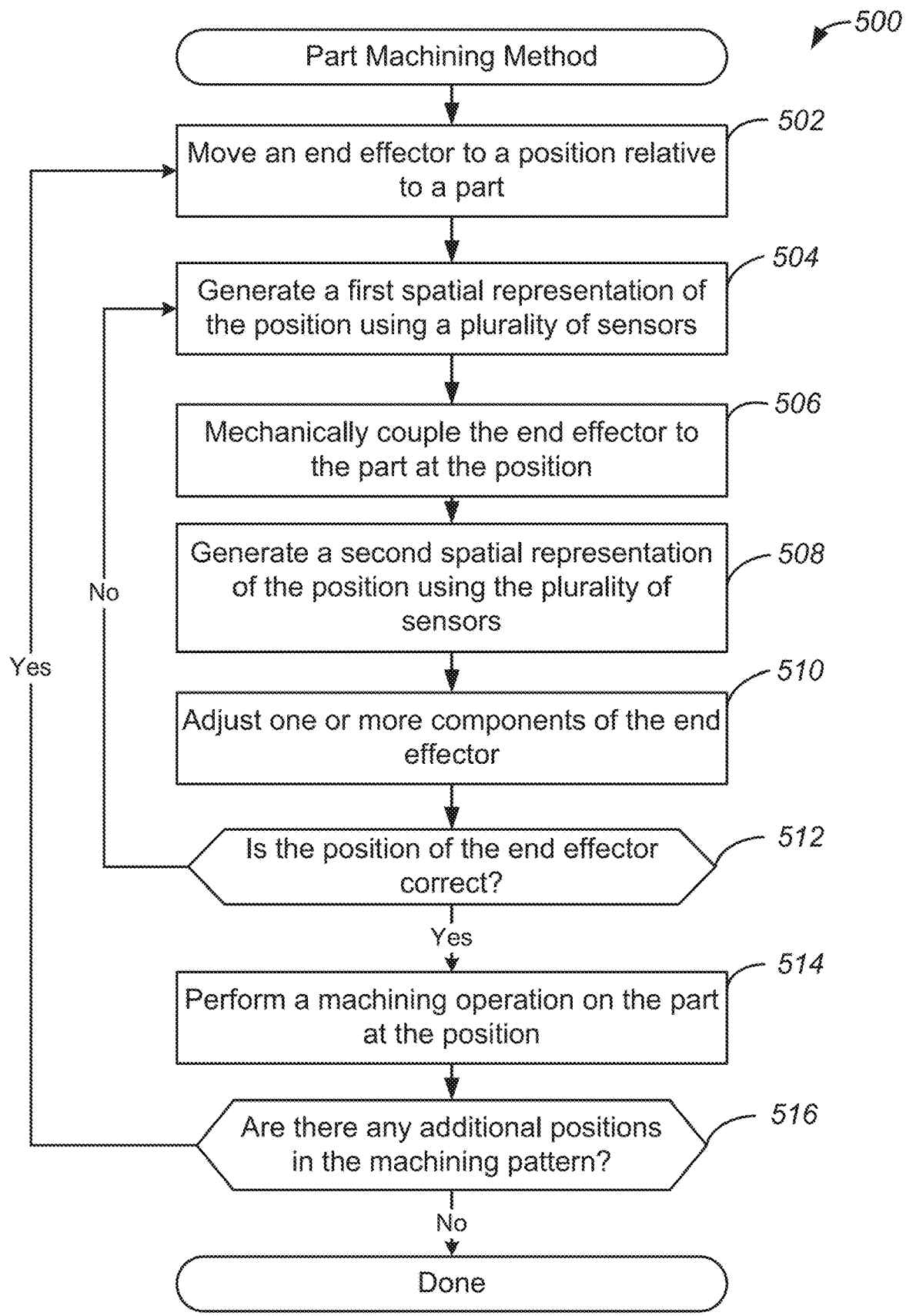
FIG. 5 illustrates a flow chart of another example of a method for machining a part, implemented in accordance with some embodiments.

FIG. 5 illustrates a flow chart of another example of a method for machining a part, implemented in accordance with some embodiments. As similarly discussed above with reference to FIG. 4, a method for machining a part, such as method 500, may include performing one or more machining operations in accordance with a machining pattern. In various embodiments, method 500 may be implemented in a single pass. Accordingly, a first spatial representation may be generated for a position in a machining pattern. The first spatial representation may be subsequently used as a reference position during a subsequent machining operation. Once the first spatial representation has been generated and recorded, the part may be clamped and a second spatial representation may be generated at the current position. The second spatial representation may be compared with the previously generated first spatial representation, any movement or positional error between the two may be corrected, and the part may be machined at that particular position. If there are any additional positions in the machining pattern, the method may be repeated for each additional position.

Accordingly, method 500 may commence by moving an end effector to a position relative to a part during operation 502. As similarly discussed above with reference to FIG. 4, the position may be identified and determined based on a machining pattern associated with the part to be machined. The machining pattern may have been previously supplied or may have been previously determined by the end effector itself. Once a position has been identified based on the machining pattern and the end effector has been moved to the position, method 500 may proceed to operation 504.

During operation 504, a first spatial representation of the position may be generated using a plurality of sensors. The first spatial representation may include one or more data values that identify an angle or surface orientation associated with a part at the position, and may also include one or more data values that identify a linear and rotational position identified by coordinates in a Cartesian and/or polar coordinate system. The first spatial representation may also include at least part of a first image captured by an imaging device included in the end effector. Thus, the first spatial representation may identify an orientation of the end effector and/or various components that may be included within the end effector, such as a machining tool, with respect to the part at the position.

During operation 506, the end effector may be mechanically coupled to the part at the position. As similarly discussed above, a coupling tool included in the end effector, such as a clamp, may be engaged and may provide mechanical coupling between the end effector and the part. The coupling tool may extend from a housing of the end effector, come into contact with a surface of the part, and apply pressure to the surface of the part to push against the part and prevent movement which may otherwise occur during subsequent machining operations.

During operation 508, a second spatial representation of the position may be generated using the plurality of sensors. As similarly discussed above, the second spatial representation may include distance measurements generated by several sensors as well as one or more data values generated based on a second image recorded by the imaging device. Accordingly, during operation 508, one or more data values may be received from the sensors and imaging device included in the end effector. The data values may be stored in a data structure as a second spatial representation of the position. As previously discussed, the second spatial representation of the position may be different than the first spatial representation because the mechanical coupling of the end effector to the part may have caused some movement in the part. Thus, due to the mechanical coupling established during operation 506, the movement introduced to the part may result in the first spatial representation being slightly different than the second spatial representation During operation 510, one or more components of the end effector may be adjusted. As discussed above with reference to FIG. 4, the end effector may be adjusted to compensate for any differences between the first spatial representation of the position and the second spatial representation of the position. For example, as previously discussed, the first spatial representation may identify a first orientation of the end effector with respect to the part. The coupling of the end effector to the part may have changed its orientation relative to the part due to any movement that was introduced. Thus, the second spatial representation may be different than the first spatial representation and may identify a second orientation of the end effector and a machining tool included in the end effector. In various embodiments, during operation 510, one or more components of the end effector may be adjusted to return the end effector and its associated components to the first orientation, thus compensating for the movement introduced by the coupling. Furthermore, as similarly discussed above with reference to FIG. 4, additional factors or variables may be used as a basis of the adjustment. Some examples of such factors or variables may include thermal expansion, machine error, drift, and re-zeroing.

The adjusting may be performed based on a comparison of the first spatial representation and the second spatial representation. For example, a data processing system may be configured to compare one or more data values of the first and second spatial representations, and identify one or more differences between the two, which may include a rotational change, a translational change, and a change in an orientation or angle of the end effector and its associated components with respect to the surface of the part. The identified changes may be stored in the data processing system for future use, and may also be stored as part of a log file. Moreover, the data processing system may generate an adjustment signal based on the identified differences that may be used to adjust the entire end effector and/or one or more components included within the end effector, such as a machining tool.

During operation 512, it may be determined whether or not the position of the end effector is correct. In various embodiments, the accuracy of the positioning of the end effector and machining tool may be determined based on whether or not the end effector and machining tool have been placed within a desired tolerance of the position that was originally identified by the machining pattern. In some embodiments, operation 512 may include generating an additional spatial representation after the adjustment of operation 510 has been made. The additional spatial representation may be compared with the first spatial representation to determine whether or not the position of the end effector and/or machining tool are positioned within an acceptable tolerance of the position identified by machining pattern and represented by the first spatial representation. For example, the data processing system may identify one or more differences between the first spatial representation and the additional spatial representation, and may compare the identified differences with a predetermined threshold that corresponds to one or more design or specification constraints. If the differences, which may be output as distances, are below the threshold, the data processing system may indicate that the position of the end effector and/or machining tool is correct. If the differences are above the threshold, the data processing system may indicate that the position of the end effector and/or machining tool is not correct.

If it is determined that the position of the end effector is not correct, method 500 may return to operation 504. Accordingly, method 500 may proceed to re-couple and re-adjust the end effector and/or machining tool at the position to again attempt to position the end effector and/or machining tool correctly and within specified tolerances. If it is determined that the position of the end effector is correct, method 500 may proceed to operation 514.

During operation 514, a machining operation may be performed on the part at the position. In various embodiments, the machining operation may include drilling a hole in the part at the position. Accordingly, a machining tool of the end effector may be engaged and may drill a hole in the part at the position. In some embodiments, the machining tool may be engaged in response to an input signal provided by the data processing system. Once the machining operation has been completed, method 500 may proceed to operation 516.

During operation 516, it may be determined whether or not there are any additional positions in the machining pattern. If it is determined that there are no additional positions in the machining pattern, method 500 may terminate. However, if it is determined that there are additional positions in the machining pattern, method 500 may return to operation 502 and operations 502-514 may be performed for each additional position in the machining pattern. For example, additional iterations of operations 502-514 may be performed for a second position, a third position, fourth position, and a fifth position of the machining pattern.

As similarly discussed above with reference to FIG. 4, while various embodiments and methods disclosed herein have been described with reference to positioners and repeatable machine paths, according to some embodiments, various operations described above may be performed optionally and independently of the existence of a repeatable machine path. Thus, various embodiments disclosed herein may be implemented in conjunction with a template or jig, and not a repeatable machine path. In this way, various embodiments and methods described herein may be used in conjunction with a template or jig, and may correct changes locally at each hole based on positions designated by the template or jig.

Figure 6:
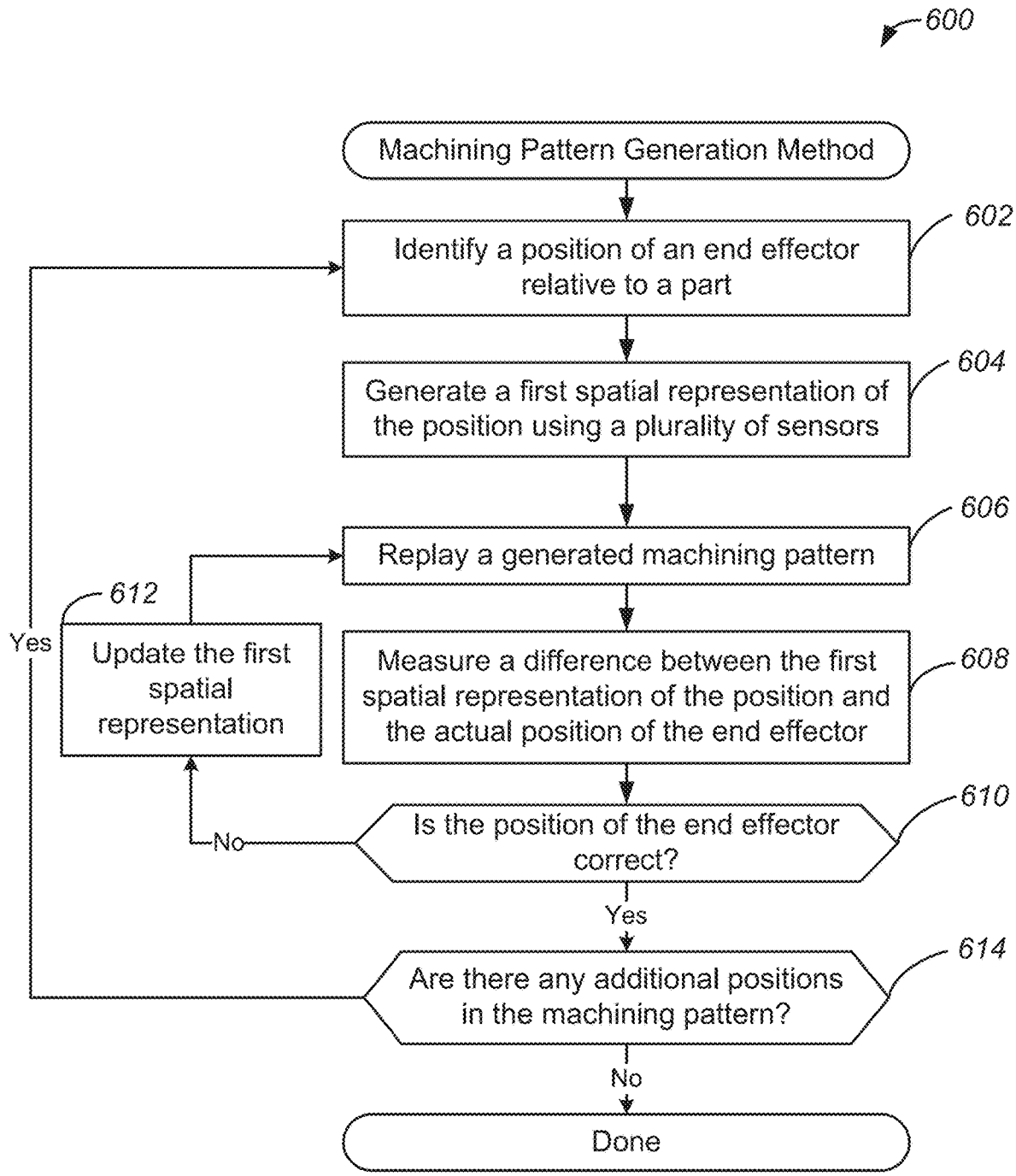
FIG. 6 illustrates a flow chart of an example of a method for generating a machining pattern, implemented in accordance with some embodiments.

FIG. 6 illustrates a flow chart of an example of a method for generating a machining pattern, implemented in accordance with some embodiments. As previously stated, a machining pattern for a particular part might not currently be available. In such a situation, a machining pattern generation method, such as method 600, may be used to generate a machining pattern which may subsequently be used to machine additional parts. In various embodiments, a machining pattern generation method may use an existing part that has already been machined as a template from which a machining pattern may be generated. Thus, according to some embodiments, an end effector, its associated components, as well as other components of a machining assembly may be configured to observe the previously machined part and generate a machining pattern that includes spatial representations for each identified position of the part. For example, the part that has already been machined may include several positions which may be holes that have been drilled in the part. Method 600 may be implemented to observe and record the positions of the holes as well as orientations and axes of the holes. In this way, a machining pattern generation method, such as method 600, may generate a machining pattern based on existing part, and the generated machining pattern may be used to machine other parts that have not already been machined in accordance with a part machining method such as method 400 and method 500.

Accordingly, method 600 may commence by identifying a position of an end effector relative to a part during operation 602. As similarly discussed above, the part may have already been machined according to a machining pattern. For example, the part may include several holes that were previously drilled according to the machining pattern by, for example, a manufacturer. In various embodiments, the end effector may be configured to identify a hole axis for each hole at each position of the machining pattern. The end effector may be used in conjunction with an adapter plate that may include a plate which is a planar surface that is coupled to a dowel. In some embodiments, the dowel may be configured to tightly fit in a hole that may be included in the part. Moreover, the plate may include one or more markings or delineations that provide reference markings for an imaging device of the end effector. In various embodiments, the adapter plate may be inserted into a hole at a particular position. For example, the adapter plate may be inserted by a user or a manufacturing technician. When inserted in the hole, the dowel of the adapter plate may be aligned with the hole axis, and the plate may be orthogonal to the hole axis. Accordingly, during operation 602 a data processing system may be configured to store data associated with a position in a machining pattern and the adapter plate may be inserted in the hole associated with the position.

During operation 604, a first spatial representation of the position may be generated using a plurality of sensors. Accordingly, the end effector may be moved to the adapter plate. In some embodiments, the end effector may be configured to automatically align itself with the reference markings on the adapter plate. Once aligned, the plurality of sensors and the imaging device included in the end effector may be used to record the surface normal and orientation of the adapter plate, and by inference the surface normal and orientation of the part at the position associated with the hole. As similarly discussed above with reference to FIG. 4 and FIG. 5, the first spatial representation may identify an angle or surface orientation associated with the part at the position, and may also identify a linear and rotational position identified by coordinates in a Cartesian and/or polar coordinate system. The first spatial representation may be stored in a memory of the data processing system as a position within the machining pattern.

During operation 606, a generated machining pattern may be replayed. In various embodiments, the machining pattern that has been generated up until the current iteration of method 600 may be replayed to emulate a machining process as it might occur when a part is being machined. The process of implementing the generated machining pattern on the already machined part to emulate the machining process provides the ability to verify that the generated positions are actually correct and are being correctly implemented by the machining assembly that includes the end effector and the machining tool. More specifically, replaying the generated machining pattern may ensure that the machining tool is being correctly lined up with each hole axis. It will be appreciated that the adapter plate is removed prior to commencing operation 606.

In one example, there might not have been any previous iterations of method 600, and the generated machining pattern might not include any previously generated positions other than the one that is currently being generated. In this example, the end effector might simply be reset to an initial starting position and then moved to the position that is currently being generated. In another example, there might have been several previous iterations of method 600, and the generated machining pattern might include several previously generated positions. In this example, the end effector might be reset to an initial starting position and may step through each of the previously generated positions as well as the one that is currently being generated to ensure accuracy through the entire machining process. In some embodiments, only the past few generated positions might be replayed. For example, the end effector may be reset to a previous position that is four positions prior to the one currently being generated. In this example, the end effector may begin stepping through the generated positions from the previous position until the position that is currently being generated is reached.

During operation 608, a difference between the first spatial representation of the position and the actual position of the end effector may be measured. Accordingly, after the replay of the generated machining pattern has concluded and the end effector has been positioned according to the position that is currently being generated, a second spatial representation may be generated that identifies the actual current position of the end effector and/or machining tool. As similarly discussed above with reference to FIG. 4 and FIG. 5, a data processing system may compare the first spatial representation with the second spatial representation, and any differences between the two may be identified. Furthermore, as similarly discussed above, additional factors or variables may be used as a basis of identified differences and subsequent adjustments. Some examples of such factors or variables may include thermal expansion, machine error, drift, and re-zeroing.

During operation 610, it may be determined whether or not the position of the end effector is correct. As similarly discussed above, the differences between the first spatial representation and the second spatial representation may be compared with a threshold value representative of an acceptable manufacturing tolerance. If it is determined that the differences are above the threshold and are not within the acceptable manufacturing tolerance, the position of the end effector and/or machining tool may be determined to not be correct, and method 600 may proceed to operation 612.

During operation 612, the first spatial representation may be updated. In various embodiments, the previously recorded first spatial representation may be modified based on the second spatial representation. For example, the identified differences between the two may be subtracted from or removed from the first spatial representation to offset the identified differences. In this way, the first spatial representation may be modified to control for or compensate for implementation errors that may have resulted in the second spatial representation being different from the first spatial representation. Once the first spatial representation has been updated, method 600 may return to operation 606 to ensure that the position of the end effector and/or machining tool that results from the use of the updated first spatial representation is now correct.

Returning to operation 610, if it is determined that the differences between the first spatial representation and the second spatial representation are below the threshold and are within the acceptable manufacturing tolerances, the position of the end effector and/or machining tool may be determined to be correct, and method 600 may proceed to operation 614.

During operation 614, it may be determined whether or not there are any additional positions in the machining pattern. Thus, if another hole is present in the machining pattern, it may be determined that there are additional positions in the machining pattern, and method 600 may return to operation 602. Accordingly, operations 602-610 may be repeated for each additional position that is identified. In this way, a position and spatial representation associated with each position may be generated and stored as part of a machining pattern associated with the particular type of part that is being observed. However, if no additional positions are identified or detected, it may be determined that there are no additional positions in the machining pattern, and method 600 may terminate.

Figure 7:
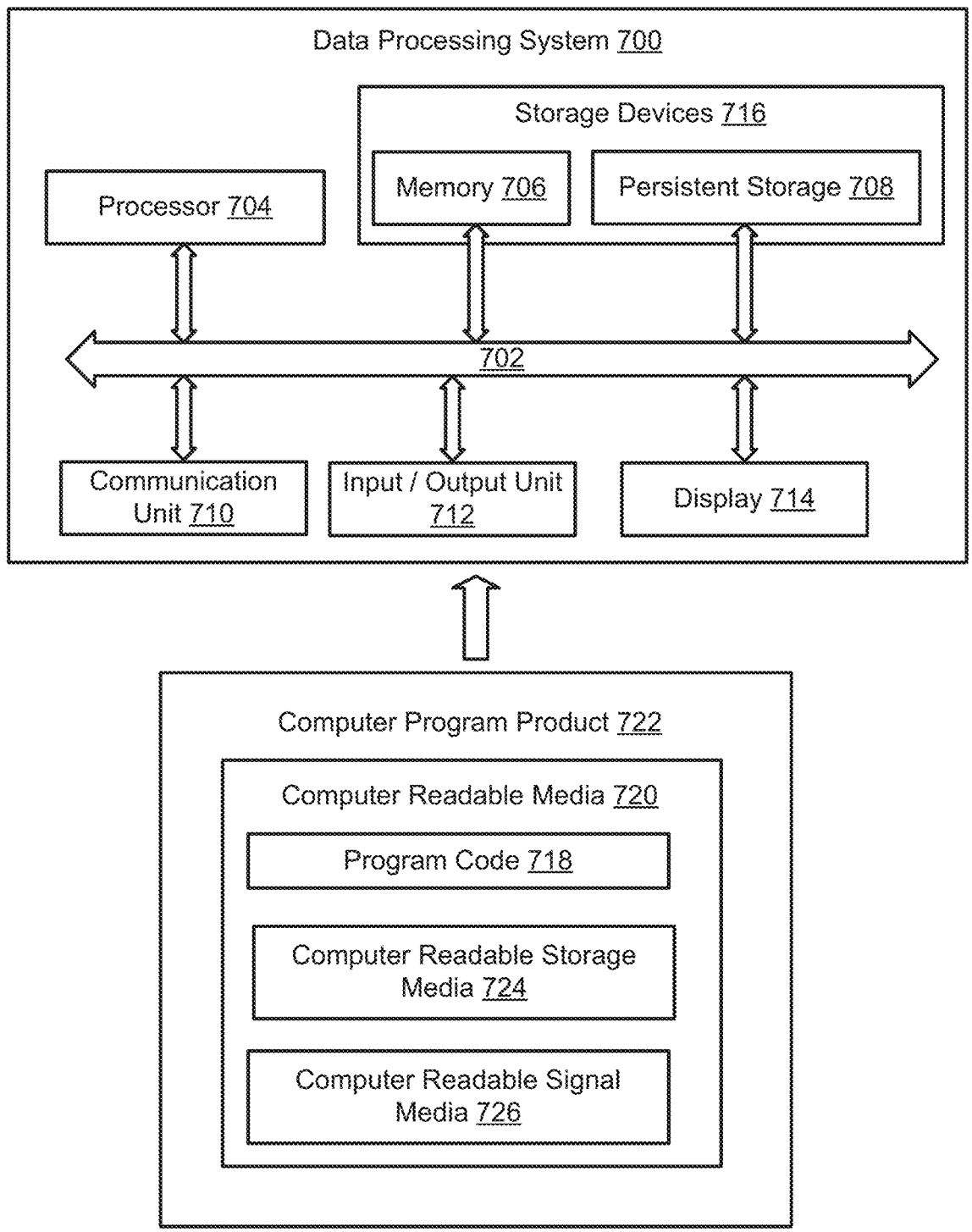
FIG. 7 illustrates an example of a data processing system configured in accordance with some embodiments.

FIG. 7 illustrates an example of a data processing system configured in accordance with some embodiments. As previously discussed, an end effector may be communicatively coupled to a data processing system, such as system 700, which may be configured to receive data from and provide signals to the end effector and one or more components included within the end effector. In this way, a data processing system, such as that shown in system 700, may control the operation of end effector and its associated components as well as other components of the machining assembly, such as a positioner. In some embodiments, one or more components of system 700 may be implemented as on board components of a production robot, and/or implemented within a laptop, an external hand held device, or a computer system. In some embodiments, data processing system 700 includes communications framework 702, which provides communications between processor unit 704, memory 706, persistent storage 708, communications unit 710, input/output (I/O) unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these illustrative examples. Memory 706, in these examples, may be, for example, a random access memory or any other suitable volatile or non-volatile storage device. Persistent storage 708 may take various forms, depending on the particular implementation. For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 may be a network interface card, universal serial bus (USB) interface, or other suitable communications device/interface.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these illustrative examples. In one example, computer readable media 720 may be computer readable storage media 724 or computer readable signal media 726.

Thus, according to various embodiments, a computer program product, such as computer program product 722, may include a non-transitory computer readable media configured to perform any of the methods disclosed herein when executed. For example, when executed, the computer program product may perform a method that includes generating a plurality of spatial representations associated with a plurality of positions identified by a machining pattern associated with the part, where the plurality of spatial representations includes a first spatial representation identifying a first orientation of a machining tool relative to the part at a first position. The methods may also include moving an end effector to the first position, where the end effector includes the machining tool and a coupling tool. The methods may also include mechanically coupling, using the coupling tool, the end effector to the part at the first position. The methods may further include generating a second spatial representation identifying a second orientation of the machining tool relative to the part at the first position. The methods may also include adjusting the machining tool in response to determining that the second spatial representation is different than the first spatial representation at the first position, where the adjusting of the machining tool returns the machining tool to the first orientation relative to the part at the first position. It will be appreciated that computer program product 722 and its associated components may be configured to perform any of the methods and operations discussed above with reference to FIGS. 1-6.

In these illustrative examples, computer readable storage media 724 is a physical or tangible storage device used to store program code 718 rather than a medium that propagates or transmits program code 718.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 700 are not meant to provide architectural limitations to the manner in which different embodiments may be implemented. The different illustrative embodiments may be implemented in a data processing system including components in addition to and/or in place of those illustrated for data processing system 700. Other components shown in FIG. 7 can be varied from the illustrative examples shown. The different embodiments may be implemented using any hardware device or system capable of running program code 718.

Figure 8:
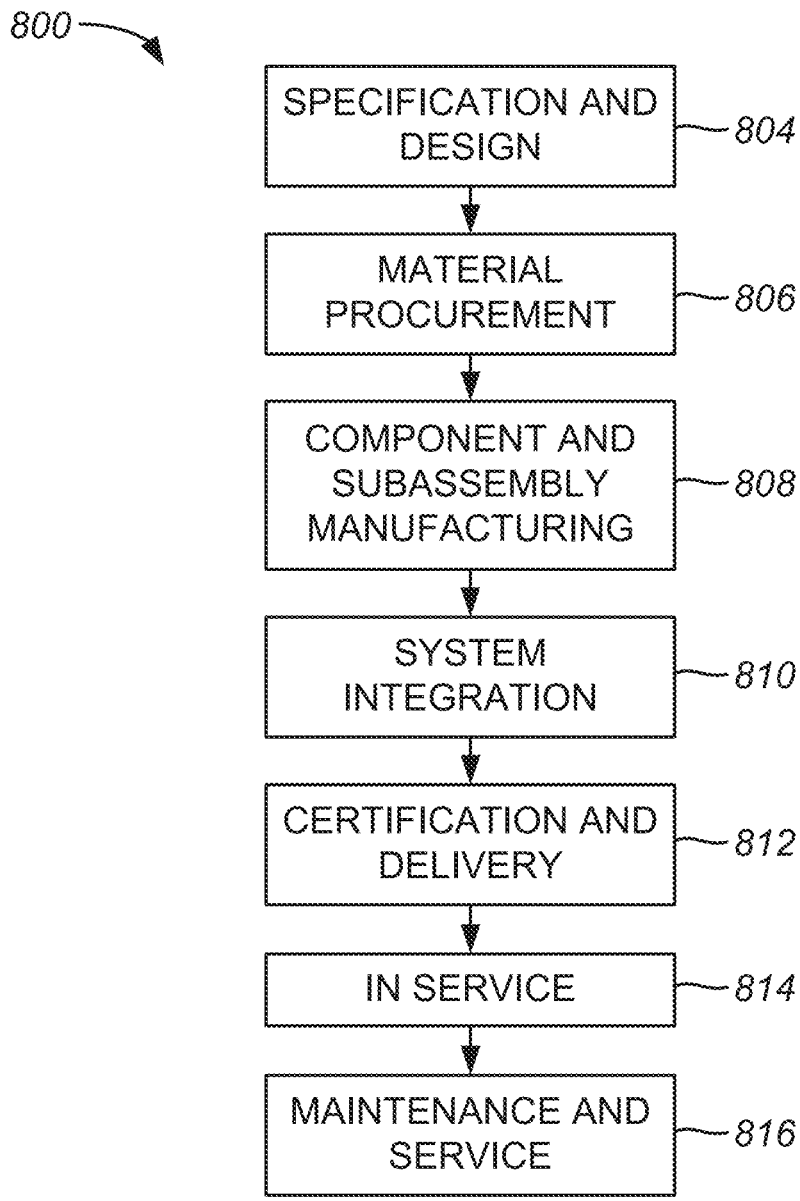
FIG. 8 illustrates a flow chart of an example of an aircraft production and service methodology, in accordance with some embodiments.
Figure 9:
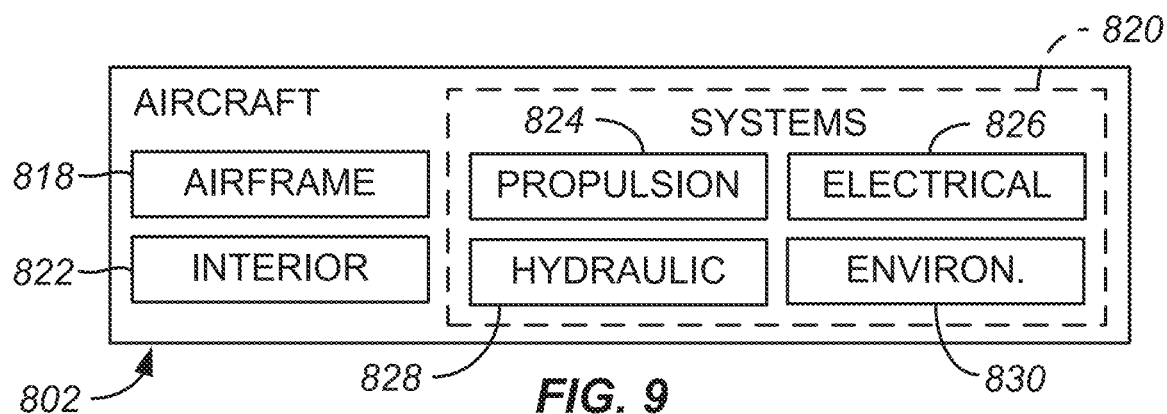
FIG. 9 illustrates a block diagram of an example of an aircraft, in accordance with some embodiments.

Various embodiments of the machining tools and methods described herein may be within the context of an aircraft manufacturing and service method 800 as shown in FIG. 8 and an aircraft 802 as shown in FIG. 9. During pre-production, illustrative method 800 may include specification and design 804 of the aircraft 802 and material procurement 806. During production, component and subassembly manufacturing 808 and system integration 810 of the aircraft 802 takes place. Thereafter, the aircraft 802 may go through certification and delivery 812 in order to be placed in service 814. While in service by a customer, the aircraft 802 is scheduled for routine maintenance and service 816 (which may also include modification, reconfiguration, refurbishment, and so on).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 802 produced by illustrative method 800 may include an airframe 818 with a plurality of systems 820 and an interior 822. Examples of high-level systems 820 include one or more of a propulsion system 824, an electrical system 826, a hydraulic system 828, and an environmental system 830. Any number of other systems may be included. Although an aerospace example is shown, the principles of the invention may be applied to other industries, such as the automotive industry.

Apparatus and methods embodied herein may be employed during any one or more of the stages of the production and service method 800. For example, components or subassemblies corresponding to production process 808 may be fabricated or manufactured in a manner similar to components or subassemblies produced while the aircraft 802 is in service. Also, one or more apparatus embodiments, method embodiments, or a combination thereof may be utilized during the production stages 808 and 810, for example, by substantially expediting assembly of or reducing the cost of an aircraft 802. Similarly, one or more of apparatus embodiments, method embodiments, or a combination thereof may be utilized while the aircraft 802 is in service, for example and without limitation, to maintenance and service 816.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A method for machining a part, the method comprising:
generating a first spatial representation identifying a first orientation of a machining tool relative to the part at a first position;
mechanically coupling an end effector to the part at a first position, the end effector including the machining tool and a coupling tool;
generating, after the coupling and using a processor, a second spatial representation identifying a second orientation of the machining tool relative to the part at the first position;
identifying, using the processor, a plurality of differences that result from the coupling and that comprise a rotational change and translational change identified based, at least in part, on a comparison of the first spatial representation and the second spatial representation; and
adjusting the machining tool to return the machining tool to the first orientation relative to the part at the first position and compensate for identified differences resulting from the coupling.

2. The method of claim 1, the first and second spatial representations being generated based, at least in part, on images captured by at least one imaging device and measurements from a plurality of sensors.

3. The method of claim 2, wherein generating the first spatial representation comprises:
 capturing the first image of the first position using the at least one imaging device;
 obtaining a first set of measurements of the first position from the plurality of sensors; and
 wherein generating the second spatial representation comprises:
 capturing the second image of the first position using the at east one imaging device; and
 obtaining a second set of measurements of the first position from the plurality of sensors.

4. The method of claim 3, herein the identifying of the plurality of differences comprises:
 comparing the first image with the second image; and
 identifying at least one difference between the first image and the second image based on the comparing of the first image with the second image.

5. The method of claim 4, wherein the comparing of the first image with the second image comprises:
 comparing a first feature included in the first image with a second feature included in the second image, wherein the first feature identifies a first characteristic of a surface of the part, and wherein the second feature identifies a second characteristic of the surface of the part.

6. The method of claim 5, wherein the first characteristic is the same as the second characteristic, and wherein the first feature and the second feature are surface features extracted from the first image and the second image of the part.

7. The method of claim 1, wherein the first spatial representation identifies a first surface orientation of the part at the first position, and wherein the second spatial representation identifies a second surface orientation of the part at the first position.

8. The method of claim 1 further comprising:
 moving, using a positioner, the end effector, wherein the end effector is communicatively coupled to a data processing system, and wherein the positioner is controlled by the data processing system.

9. The method of claim 1, wherein the first spatial representation and the second representation are included in a plurality of spatial representations, and wherein the plurality of spatial representations further includes a third spatial representation identifying a first orientation of the machining tool relative to the part at a second position.

10. The method of claim 9 further comprising:
 performing, using the machining tool, a first machining operation on the part at the first position;
 moving the end effector to the second position;
 mechanically coupling, using the coupling tool, the end effector to the part at the second position;
 generating a fourth spatial representation identifying a second orientation of the machining tool relative to the part at the second position;
 adjusting the machining tool in response to the fourth spatial representation being different than the third spatial representation, wherein the adjusting of the machining tool returns the machining tool to the first orientation relative to the part at the second position; and
 performing, using the machining tool, a second machining operation on the part at the second position.

11. An apparatus for machining a part, the apparatus comprising:
 a positioner having a first end;
 an end effector including a housing, the housing being coupled to the first end of the positioner;
 a machining tool included in the housing;
 a plurality of sensors configured to measure a position and orientation of the end effector and machining tool relative to the part based, at least in part, on distance measurements;
 a coupling tool coupled to the housing, wherein the coupling tool is configured to mechanically couple the end effector with the part; and
 one or more processors configured to generate a first spatial representation and a second spatial representation of the machining tool, and further configured to identify a plurality of differences that result from the coupling and that comprise a rotational change and translational change identified based, at least in part, on a comparison of the first spatial representation and the second spatial representation, wherein the identifying of the plurality of differences enables adjusting of the machine tool to compensate for the identified differences.

12. The apparatus of claim 11, wherein the machining tool includes a drill configured to drill a hole in a material of the part.

13. The apparatus of claim 11, wherein the coupling tool includes a clamping plate configured to apply pressure to the part.

14. The apparatus of claim 11, wherein the plurality of sensors comprises a plurality of linear distance sensors.

15. The apparatus of claim 14, wherein the plurality of distance sensors includes a plurality of sensors selected from the group consisting of: a plurality of linear variable distance transformers and a plurality of optical encoders.

16. The apparatus of claim 11 further comprising an imaging device included in the housing and configured to capture images of the part, wherein the plurality of differences is identified based on a comparison of the images and the distance measurements.

17. A method for machining a part, the method comprising:
 moving an end effector to a position identified by a machining pattern associated with the part, the end effector including a machining tool and a coupling tool;
 generating a first spatial representation identifying a first orientation of the machining tool relative to the part;
 mechanically coupling, using the coupling tool, the end effector to the part at the position;
 generating, after the coupling and using a processor, a second spatial representation identifying a second orientation of the machining tool relative to the part;
 identifying, using the processor, a plurality of differences that result from the coupling and that comprise a rotational change and translational change identified based, at least in part, on a comparison of the first spatial representation and the second spatial representation; and
 adjusting the machining tool in response to determining that the second spatial representation is different than the first spatial representation.

18. The method of claim 17, wherein the first and second spatial representations are generated based, at least in part, on images captured by an imaging device and measurements from a plurality of sensors, wherein generating the first spatial representation comprises capturing a first image using the imaging device, wherein generating the second spatial representation comprises capturing a second image using the imaging device, and wherein the determining that the second spatial representation is different than the first spatial representation at the position comprises:
  comparing the first image with the second image; and
  identifying at least one difference between the first image and the second image based on the comparing of the first image with the second image.

19. The method of claim 17 further comprising:
  performing a machining operation on the part with the machining tool at the second updated position.

20. An aircraft comprising the part machined in accordance with the method of claim 19.

* * * * *